July 12, 1966  W. L. KIBLER ET AL  3,260,284
WINDSHIELD WASHER Filed March 5, 1964  6 Sheets-Sheet 1

INVENTORS.
ROBERT H. OPDYKE
WILLIS L. KIBLER

BY Rudolph L. Lowell

ATTORNEY.

July 12, 1966  W. L. KIBLER ET AL  3,260,284
WINDSHIELD WASHER
Filed March 5, 1964  6 Sheets-Sheet 2

INVENTORS.
ROBERT H. OPDYKE
WILLIS L. KIBLER

BY *Rudolph L. Lowell*

ATTORNEY.

United States Patent Office 3,260,284
Patented July 12, 1966

3,260,284
WINDSHIELD WASHER
Willis L. Kibler and Robert H. Opdyke, both of Detroit, Mich., assignors to The Delman Company, Cookeville, Tenn., a corporation of Tennessee
Filed Mar. 5, 1964, Ser. No. 349,775
25 Claims. (Cl. 141—3)

This invention relates to a vehicle windshield washer and more particularly to a windshield washer system having cleaning liquid constantly subjected to a gaseous pressure for controlled discharge onto the windshield of a vehicle.

It is the object of the invention to provide an improved washer system for dispensing cleaning liquid on the windshield of a vehicle.

Another object of the invention is to provide a windshield washer system with a readily replaceable and disposable solvent container which carries the windshield solvent and the source of gaseous pressure for the washer system.

A further object of the invention is to provide a windshield washer system having a supply of cleaning fluid with a sustained supply of gaseous pressure which is maintained within desired limits and does not vary unduly as cleaning fluid is dispensed onto the surface to be cleaned.

Still another object of the invention is to provide a windshield cleaning solvent which absorbs gas when placed under pressure and releases the gas when mixed with water.

Another object of the invention is to provide an improved method of coupling in fluid communication a first pressure chamber with a second pressure chamber.

An additional object of the invention is to provide an economical and reliable windshield washer system which is readily controlled to deliver desired amounts of cleaning fluid to the windshield of a vehicle.

Further objects, features and advantages of this invention will appear from the following description and accompanying drawing, in which.

Figure 1:
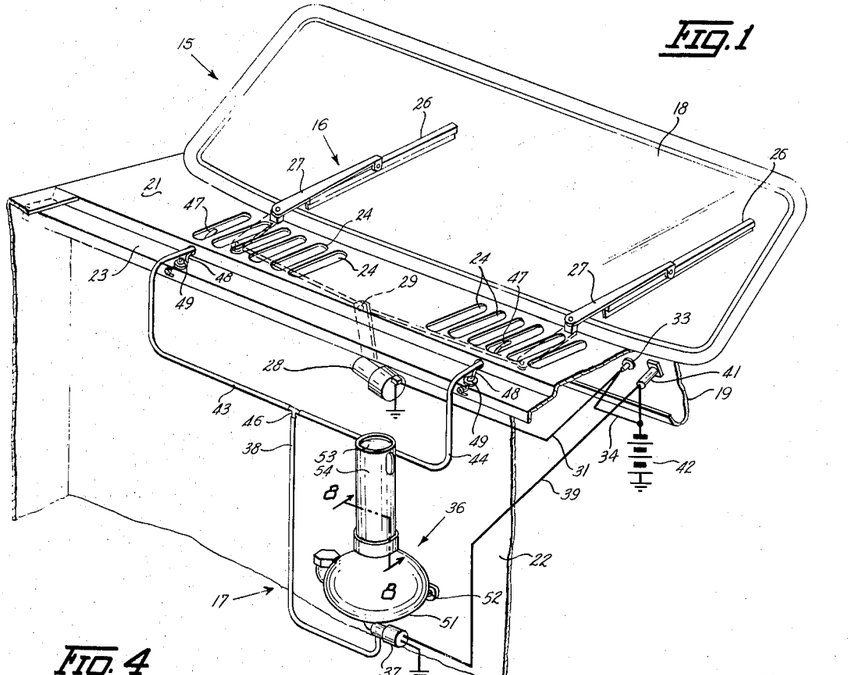
FIG. 1 is a fragmentary perspective view of a vehicle equipped with the windshield washer of the invention.

Referring to the drawing, there is shown in FIG. 1 a portion of a vehicle 15 equipped with a conventional windshield wiper system 16 and the windshield washer system 17 of this invention.

The vehicle 15 has an upwardly and rearwardly projected windshield 18 positioned forwardly of a dashboard 19. Positioned adjacent the lower edge of the windshield 18 is a forwardly extended cowl 21 which is secured to a downwardly directed fire wall 22. The cowl 21 is formed with a downwardly stepped front section 23 and has a plurality of longitudinal ventilating and heater air openings 24.

The wiper system 16 includes a pair of wiper elements 26 positioned in engagement with the outside surface of the windshield 18. Arms 27 support the wiper elements 26 on the cowl 21 adjacent the forward edge of the windshield 18. The wiper elements 26 and their respective arms 27 are oscillated relative to the windshield 18 by a motor 28 which is operatively connected to the arms 27 by a linkage 29.

The motor 28 is illustrated as a conventional electric unit having a line 31 connected to a manually operated switch 33 mounted on the dashboard 19. The switch 33 is connected to a battery 42 by line 34. The switch 33 is a conventional on-off unit and functions to electrically connect and disconnect the motor 28 and the battery 42. When the motor 28 is operated the linkage 29 is moved to transmit motion to the arms 27 which oscillate the wiper elements 26 over the windshield 18.

The washer system 17 comprises a cleaning fluid supply assembly indicated generally at 36 which is mounted on the forward side of the fire wall 22. Stored in the fluid supply assembly 36 is a quantity of windshield cleaning fluid which is subjected to a superatmospheric gaseous pressure. Connected in fluid communication with the bottom of the assembly 36 is a solenoid operated control valve 37 which functions to regulate the flow of cleaning fluid from the assembly 36 into a hose 38. The solenoid control valve 37 is a commercial unit identified as a Skinner electric valve two-way C series type CV manufactured by the Skinner Precision Industries, Inc., New Britain, Conn.

The solenoid control of the valve 37 is connected by a lead 39 and an on-off switch 41 to a battery 42. The switch 41 is mounted on the dashboard 19 where it is readily accessible to the operator of the vehicle. When the switch 41 is in an on position the solenoid of the valve 37 is energized opening the valve 37. When the valve 37 is open the cleaning fluid under pressure in the fluid supply assembly 36 will flow through the hose 38 into hoses 43 and 44 which are connected to the hose 38 by a T-coupling 46. The ends of the hoses 43 and 44 are connected to nozzles 47 adjustably supported on the stepped section 23 of the cowl by wire nozzle support assemblies 48. Adjustable screws 49 for the wire support assemblies 48 function to align the nozzles 47 with one of the ventilating and heater air openings 24 and to adjust the impact position of the streams of cleaning fluid dispensed on the windshield 18.

The operation of the washing system 17 is commenced on the manual actuation of the switch 41 to the on position which connects the battery 42 with the solenoid of the control valve 37. The valve 37 will remain in the open position as long as the solenoid is energized. With the valve 37 open the cleaning fluid under pressure in the fluid supply assembly 36 flows through the hose 38 into the hoses 43 and 44 and is discharged through the nozzles 47 and deposited on the windshield 18 into the path of movement of the oscillating wiper elements 26. The duration of the dispensing of cleaning fluid on the windshield 18 is dependent on the length of time that the manually operated switch 41 is in the on position. When the switch 41 is moved to the off position the solenoid of the valve 37 is de-energized and the valve 37 automatically closes to terminate the flow of cleaning fluid from the fluid supply assembly 36.

The cleaning fluid supply assembly 36 shown in FIG. 1 comprises a reservoir 51 attached to the fire wall 22 by a pair of bolt and nut assemblies 52 (one of which is shown). A disposable solvent container 53 is releasably attached to the top of the reservoir 51 by a cylindrical housing or sleeve 54.

Figure 2:
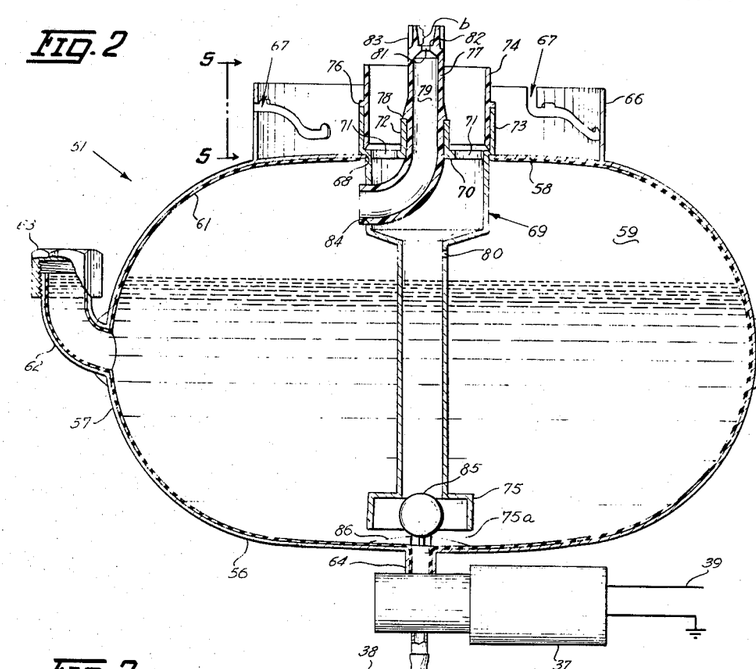
FIG. 2 is an enlarged side view partly in section of the reservoir and control valve assembly of the windshield washer of FIG. 1.

Referring to FIG. 2, the reservoir 51 is a one-piece metal unit having a curved bottom wall 56, an outwardly curved upright side wall 57 and a dome-shaped top wall 58 to form a chamber 59. The reservoir 51 is formed from steel and is coated on its inner surface with a corrosion-proof lining 61. The reservoir may also be formed from a suitable plastic or die cast material.

Integral with the side wall 57 is a right angle filler neck 62 projected in an upward direction and terminating below the level of the top wall 58. A cap 63 threadably engages the open end of the filler neck 62 and functions to fluid seal the chamber 59. The filler neck 62 also functions as a stand pipe to provide a foolproof level for a liquid, such as water, within the reservoir 51. In other words the level of the liquid in the chamber 59 is determined by the upward extent of the filler neck 62.

The valve 37 is connected in a fluid communicating relation with the chamber 59 by a coupling 64 secured to the central area of the bottom wall 56. The coupling 64 supports the valve 37 and its control solenoid on the reservoir 51.

Mounted centrally on the top wall 58 of the reservoir 51 is a locking ring 66 of an upright cylindrical shape. Positioned in the locking ring 66 are a plurality of downwardly and circumferentially directed slots 67 the purpose of which will be subsequently described in detail. Concentrically spaced within the locking ring 66 and formed in the top wall 58 is a circular opening 68 into which is seated a metal tube or support member 69 of an annular shape. The support member 69 includes a disc 70 formed with a plurality of holes 71 and inner and outer concentric annular upright walls 72 and 73, respectively. The outer wall 73 has an enlarged top section secured to the reservoir top wall 58. The body of the tube 69 projects downwardly into the reservoir terminating adjacent the bottom wall 56 in an inverted cup-shaped end 75 which with the bottom wall 56 forms a passage 75a for the movement of liquid from the tube into the reservoir. The top portion of the tube 69 has a hole 80 providing gas communication between the inside of the tube and chamber 59.

Positioned within the cup-shaped end 75 of the tube 69 is a ball 85 of a diameter larger than the bore of the tube. A plurality of spaced ribs 86 on the reservoir bottom wall 56 adjacent the opening for the coupling 64 prevents the ball 85 from closing the opening. The ball 85 on a reduction of pressure in the tube 69 relative to the pressure in the chamber 59 will move upwardly into a sealing relation with the side wall of the body of the tube 69 and thereby prevent the liquid in the reservoir from moving up in the tube.

A cylindrical sleeve 74 formed from a hard plastic material is telescoped within the outer upright annular wall 73. The sleeve 74 has an annular peripheral rib 76 which engages the top of the annular wall 73 and functions as a stop when the sleeve 74 is assembled on the annular wall 73. The sleeve 74 is of a diameter to form a tight fit with the upright annular wall 73 so as to provide a fluid sealed relationship between the annular wall 73 and the sleeve 74.

An upright tubular member 77 formed from a hard plastic material is seated in the hole formed by the inner annular wall 72 and projects upward along the axis of the cylindrical sleeve 74. The tubular member 77 has an integral peripheral rib 78 which extends around its midsection and engages the top of the annular wall 72 to define the assembled position of the tubular member 77 with respect to the annular wall 72. Extended longitudinally through the tubular member is a passage 79 which opens into the chamber 59. The top section of the tubular member 77 has a reduced diameter hole 81 and a circular seat 82 extended circumferentially around the hole 81. The outer peripheral surface of the top section of the tubular member 77 is fluted to form longitudinal grooves 83 open to the top end of the tubular member. The bottom section of the tubular member 77 is curved and extends through a hole 84 in the tube 69. The outer peripheral surface of the bottom section of the member 77 is in a sealed relation with the tube 69.

Figure 3:
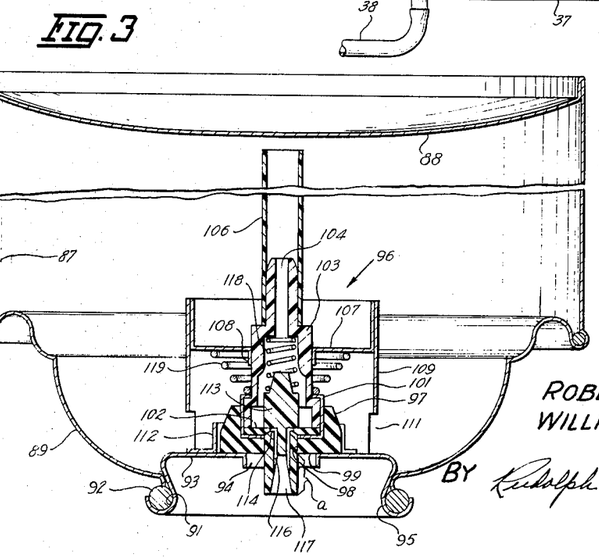
FIG. 3 is a foreshortened enlarged sectional view of the disposable solvent container of the windshield washer of FIG. 1.

The disposable solvent container 53, illustrated in detail and in inverted position in FIG. 3, has a cylindrical side wall 87, a concave-shaped bottom wall 88 and a top wall 89 having a central opening 91 defined by a reinforcing ring 92. The opening 91 is closed with a cup-shaped metal cap 93 having a central hole 94 and an annular flange 95 rolled around the reinforcing ring 92 in a sealing relationship with the ring 92. In the assembly of the cap 93 on the top wall 89 that portion of the annular flange 95 which extends into the container 53 is circumferentially expanded to a diameter greater than the diameter of the reinforcing ring 92 so as to positively hold the cap 93 in assembled relation with the top wall 89.

Mounted on the inside of the cup-shaped cap 93 is a valve assembly indicated generally at 96 which functions to open and close the hole 94 in the cap 93. The valve asembly 96 comprises a cup-shaped seal or valve member 97 of deformable rubber material having a central hole 98 and a flat surface 99 in bearing or seating engagement with a circumferential portion of the cap 93 adjacent the hole 94. Seated within the cup-shaped valve member 97 is an annular metal ring 101 which has an inwardly directed first flange for clamping a flexible flat washer 102 to a tubular plastic housing 103, and a second flange positioned between the washer 102 and the base of the valve member 97. The washer 102 is in concentric alignment with the center hole 98 in the seal 97.

The tubular housing 103 is of a cylindrical shape and has a longitudinal fluid passage 104. The inwardly directed end of the housing 103 is of a reduced diameter for connection with a flexible plastic tube 106 which terminates in a contiguous relationship with the bottom wall 88. The housing 103 and the seal 97 are guided for longitudinal movement by a transversely extended disc 107 having a center opening defined by a cylindrical flange 108 which is in sliding engagement with the peripheral surface of the center section of the housing 103. The disc 107 has a peripheral flange connected to a sleeve 109 which in turn is connected to the cap 93 and has circumferentially spaced openings 111 adjacent the cap 93. The flexible seal 97 is maintained in substantial alignment with the axis of the hole 94 by inwardly directed fingers 112 secured to the cap 93. The fingers 112 are positioned in a spaced relation with respect to the peripheral wall of the seal 97 so as to not interfere with the longitudinal movement of the seal 97.

The seal 97 is biased into a sealed relationship with the cap 93 and the housing 103 and ring 101 are held in assembled relation with the seal 97 by a coil spring 119 interposed between the first flange of the ring 101 and the disc 107. The spring 119 is conical in shape and functions in compression to bias the housing 103 and the seal 97 toward the cap 93.

Interposed in an enlarged section of the passage 104 in the tubular housing 103 is a movable plastic valve member 113 having an annular peripheral groove 114. The outer end section of the valve member 113 projects through the central hole 98 in the seal 97 and has a plurality of axial passages 116 which open into the annular groove 114. A conical-shaped recess 117 is formed in the outer end of the valve member 113 and intersects the passages 116. A coil spring 118 positioned in the passage 104 is arranged in compression between the housing 103 and valve member 113. The spring 118 biases the valve member 113 in an outward direction and holds the central portion of the flat washer 102 in a sealed relationship with the valve member 113 and the second flange of the metal ring 101. The outward movement of the valve member 113 by the spring 118 is limited by the flexible flat washer 102 which is seated in the annular groove 114. In this position the flat washer 102 seals the openings of the passages 116 at the groove 114.

The valve member 113 extends outwardly from the flat surface 99 of the seal 97 a distance indicated in FIG. 3 by the letter $a$. This distance is substantially equal to the depth of the circular seat 82 in the tubular member 77 as shown in FIG. 2. This depth is indicated by the letter $b$.

Figure 4:
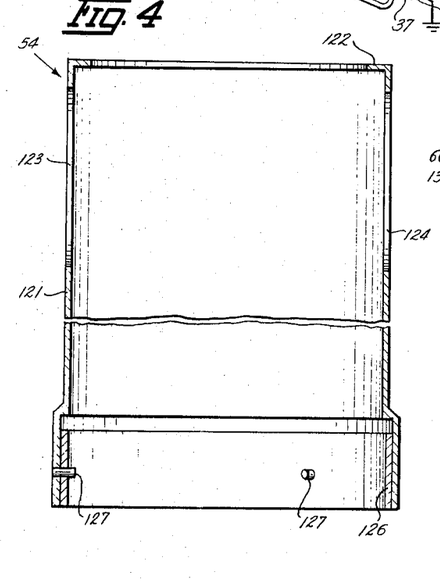
FIG. 4 is a foreshortened enlarged sectional view of the solvent container holding housing of the windshield washer of FIG. 1.

The housing 54 which retains the disposable solvent container 53 on the reservoir 51 is illustrated in FIG. 4. The housing 54 comprises a cylindrical aluminum casing 121 having a length greater than the height of the disposable solvent container 53. Integral with the top end of the casing 121 is an inwardly directed annular flange 122 adapted to engage the peripheral edge of the bottom wall 88 of the solvent container 53. The casing 121 has oblong openings 123 and 124. The openings 123 and 124 diametrically oppose each other and extend in a longitudinal direction and permit the gripping of the sides of the disposable solvent container 53 to retain the container in an assembled relation with the housing 54 during the connection of the container to the reservoir 51.

The lower section of the casing 121 is of an enlarged diameter and carries a metal reinforcing cylindrical liner 126 which is fastened to the inner peripheral surface of the casing 121. The liner 126 is formed from steel and has a diameter which is slightly larger than the diameter of the locking ring 66 secured to the top wall 58 of the reservoir 51. Inwardly directed studs or bayonets 127 are secured to the liner 126 and are angularly spaced relative to each other in accordance with the circumferential spaced relationship of the slots 67 in the locking ring 66.

Figure 5:
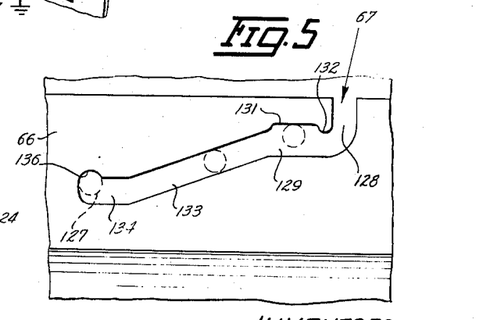
FIG. 5 is an enlarged sectional view taken along the line 5—5 of FIG. 2.

Referring to FIG. 5, there is shown the specific shape of the slot 67 with a stud 127 being illustrated in broken lines in relatively moved positions. The slot 67 has a downwardly directed section 128 open to the top edge of the ring 66. Joined with the lower end of the downwardly directed section 128 is a safety lock section 129 extended in a circumferential direction substantially normal to the downwardly directed section 128. The safety lock section 129 has an upwardly directed recess or cut away portion 131 which is separated from the downwardly directed section 128 by a projection 132. The safety lock section 129 opens into a downwardly inclined section 133 which leads to a circumferentially extended lock section 134. Formed in the terminating end of the lock section 134 is an upwardly directed semicircular lock recess 136 having a radial dimension substantially equal to the radius of a stud 127.

The locking ring 66 is provided with three slots which are substantially identical to the slot 67. The housing 54 has three studs 127 which coact with the three slots 67 to lock the housing on the reservoir 51.

The disposable solvent container 53 has a quantity of liquid solvent which fills approximately 70% of the volume of the container with the remaining 30% being occupied with a gas under superatmospheric pressure.

When the container 53 is placed in an assembled position on the reservoir 51 the gas and liquid solvent is transferred to the reservoir chamber 59.

In order to assemble the disposable container 53 on the reservoir 51 the container is placed in the housing 54 in a position such that the periphery of the concave bottom wall 88 engages the inwardly directed flange 122 of the housing. The housing 54 and container 53 are held in an inverted position by gripping opposite portions of the container 53 through the oblong openings 123 and 124.

Figure 6:
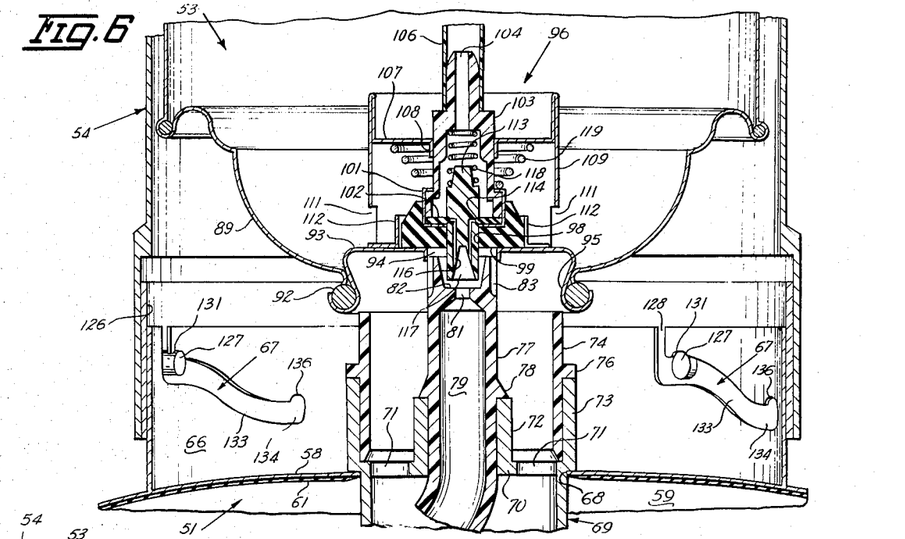
FIG. 6 is an enlarged detail sectional view of the disposable solvent container assembled in an initial safety locked position on the reservoir.

As shown in FIG. 6, the container 53 is positioned on the reservoir 51 with the liner 126 of the housing 54 telescoped over the cylindrical ring 66. Rotation of the housing 54 relative to the ring 66 aligns the studs 127 with the slots 67. With the studs 127 seated in the safety lock recesses 131 the tubular member 77 is in axial alignment with the valve assembly 96 carried by the cap 93 of the container 53 and the flange 95 of the cap 93 is positioned adjacent the top of the sleeve 74. The alignment of the valve assembly 96 with the tubular member 77 is such that the lower end of the movable valve member 113 is in registration with the circular seat 82 of the tubular member 77. In this position the fluted top end of the tubular member 77 is in axial alignment with the hole 94 in the cap 93.

Figure 7:
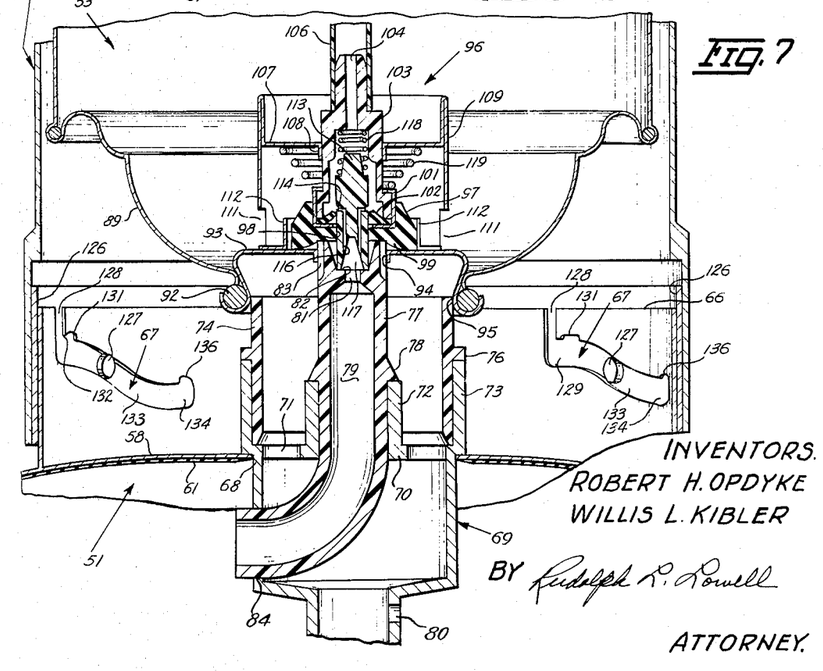
FIG. 7 is a sectional view similar to FIG. 6 showing the disposable solvent container moved onto the reservoir toward the normally locked position.

As shown in FIG. 7, the housing 54 has been rotated in a clockwise direction moving the studs 127 along the slot 67 toward the lock recess 136. The studs 127 coact with the top walls of the slots 67 to move the container 53 in a downward direction. The movement of the container 53 in a downward direction forces the flange 95 of the cap 93 into sealing engagement with the outer peripheral surface of the sleeve 74. The lower end of the movable valve member 113 rests on the circular seat 82 of the tubular member 77 and stops the downward movement of the valve member 113. Continued downward movement of the container 53 carries the inner peripheral portion of the flexible flat washer 102 out of the annular groove 114 and opens the passages 116 to the passage or bore 104. With the passages 116 in fluid communication with the passage 104 the gas in the top 30% of the container 53 will flow through the flexible tube 106, the passage 104 and around the movable valve 113 and through the passages 116 in the movable valve 113 into the conical recess 117. From the recess 117 the gas flows through the hole 81 into the passage 79 which opens into the reservoir chamber 59.

Initially the gas in the solvent container 53 will purge the passages 104 and 116 of liquid or foreign material so as to provide an uninterrupted flow of gas between the container 53 and the chamber 59 of the reservoir 51. This flow of gas will continue until the pressure in the chamber 59 and in the container 53 is substantially equal. Thus with only the valve 113 open no flow of liquid solvent from the container 53 into the chamber 59 takes place due to the action of the coil spring 119 to bias the seal 97 into engagement with the cap 93. The fluted end of the tubular member 77 deforms the bottom surface of the seal 97 but does not break the sealing relationship between the bottom surface 99 of the seal 97 and the cap 93.

Figures 8, 9:
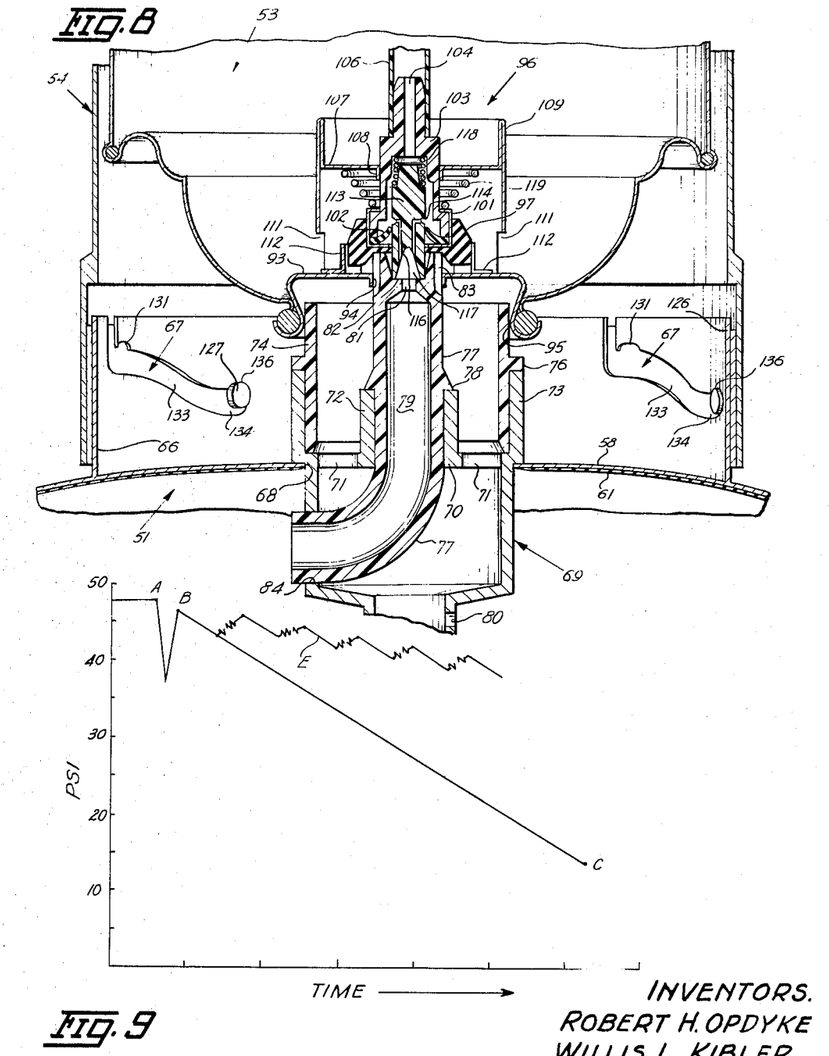
FIG. 8 is an enlarged sectional view taken along the line 8—8 of FIG. 1 showing the disposable solvent container assembled in the normally locked position on the reservoir.
FIG. 9 is a graph showing the operating pressure changes of the washer system of FIG. 1.

As shown in FIG. 8, the housing 54 has been rotated in a clockwise direction until the studs 127 are seated in the semicircular lock recesses 136. During the movement of the housing 54 to the locked position, as shown in FIG. 8, the annular flange 95 of the cap 93 moves down on the sleeve 74 and maintains a sealed relationship with the outer peripheral surface of the sleeve 74. This relative movement of the container 53 with respect to the reservoir 51 breaks the sealing relationship of the seal 97 with the cap 93. This is achieved by the movement of the fluted end of the tubular member 77 through the hole 94 in the cap 93 a sufficient distance to compress the spring 119. The valve member 113 does not move relative to the tubular housing 103 because the cup-shaped seal 97 and the tubular housing 103 move as a unit against the biasing force of the spring 119. Thus, the fluid communication of the gas between the container and the chamber 59 of the reservoir 51 is uninterrupted. The fluid pressure in the container 53 and reservoir 51 holds the studs 127 firmly seated in the lock recesses 136.

The liquid solvent in the container 53 under the influence of gravity and the gas pressure in the top of the container flows under the seal 97, and through the hole 94 in the cap 93 which remains open by the grooves 83 in the fluted end of the tubular member 77. From the cap 93 the liquid solvent flows downwardly around the tubular member 77 and through the holes 71 into the tube 69 which carries the solvent to the bottom of the reservoir 51. Since the solvent has a lower specific gravity than the water in the reservoir 51, the solvent mixes with the water as it rises in the reservoir. Excessive gas pressure in the tubular member 69 is vented through the hole 80 to the chamber 59.

As the level of the liquid solvent in the container 53 is lowered gas in the chamber 59 flows through the valve member 113, the passage 104 surrounding the valve member 113, and the flexible tube 106 into the top of the container 53. Thus with gas replacing the liquid in the container 53, the liquid will continue to flow into the reservoir 51 as long as the seal 97 is spaced from the cap 93.

In terms of a method of transferring liquid under gaseous pressure from a container 53 to an enclosed reservoir 51 the initial step comprises the coupling of the container 53 in a fluid sealed relationship with the reservoir. The gaseous pressure in the container 53 is then released into the reservoir 51 to equalize the gas pressure in the container and the reservoir. After the pressures in the reservoir 51 and container 53 are equalized gaseous fluid communication between the container and the reservoir is maintained while the liquid in the container is discharged into the reservoir. This discharging of liquid into the reservoir from the container will be continuous because the liquid in the container 53 is replaced by gas from the reservoir 51.

When the supply of cleaning fluid in the reservoir 51 has been exhausted the disposable container 53 is removed from the reservoir by rotating the housing 54 in a counterclockwise direction. Initially the housing 54 is moved until the studs 127 are positioned in the safety lock recesses 131 as shown in FIG. 6. In this position the pressure in the reservoir 51 and container 53 will move the annular flange 95 out of a sealing engagement with the peripheral surface of the sleeve 74 with the result that any superatmospheric pressure remaining in the chamber 59 of the reservoir 51 will be released to the atmosphere before the container is completely uncoupled from the reservoir. The studs 127 coact with the recesses 131 preventing the violent separation of the container 53 from the reservoir 51. The ball 85 moves into a sealing relation with the tubular member 69 with a reduction of pressure therein relative to the pressure in chamber 59. When the ball 85 is in this position any remaining liquid in the reservoir 51 is prevented from moving up in the tube.

Further counterclockwise movement of the housing 54 aligns the studs 127 with the downwardly directed sections 128 of the slots 67 whereby the housing 54 and container 53 are moved upwardly to separate the housing 54 from the ring 66 of the reservoir 51.

After the reservoir 51 has been refilled with a cleaning liquid, such as water, to a level determined by the filler neck 62, a replacement solvent container similar to the container 53 is assembled on the reservoir 51 as described above.

By way of example, and not to limit the invention, the following dimensions and quantities are suggested for use in connection with the windshield washer system 17. The container 53 has a capacity of twenty-six fluid ounces and is filled with twenty ounces of methanol ($CH_3OH$). Mixed with the methanol is sixteen grams of dry carbon dioxide. This mixture of carbon dioxide and methanol results in a pressure of approximately 45 p.s.i. in the container 53. The gaseous carbon dioxide pressure in the container 53 is maintained at a substantially level value because part of the carbon dioxide is soluble in the methanol. In other words, the methanol absorbs part of the carbon dioxide thereby keeping the pressure at a relatively low level.

The reservoir 51 has a volumetric capacity of sixty-five fluid ounces. The stand pipe 62 is at a level which limits the amount of water that can be placed in the reservoir to forty fluid ounces. The remaining space of twenty-five fluid ounces is filled with air at atmospheric pressure.

When the container 53 is connected in a fluid communicating relationship with the reservoir 51 the gas pressure in the container 53 is equalized with the air space in the reservoir 51. As shown in FIG. 9, the container 53 is coupled to the reservoir 51 at point A. The gas pressure in the system initially drops and then builds up to a point B. This build-up of pressure in the reservoir 51 and container 53 is caused by the mixing of the methanol and carbon dioxide with the water in the reservoir 51. When the methanol in the container 53 is mixed with water a portion of the carbon dioxide absorbed in the methanol is released thereby increasing the gaseous pressure in the reservoir 51. This gas release takes place because carbon dioxide gas is less soluble in water than in methanol. The valve assembly 96 is operable to maintain equalization of pressure between the reservoir 51 and the container 53. This permits the free flow of the methanol and carbon dioxide mixture from the container 53 into the reservoir 51.

As shown in FIG. 9, the line BC represents the drop of pressure in the reservoir 51 from approximately 45 pounds per square inch to 15 pounds per square inch over a continuous period of time required to empty the sixty fluid ounces of liquid from the reservoir 51.

In the normal operation of the washer system 17 the duration of dispensing cleaning fluid onto the windshield is limited to the time and amount of cleaning fluid necessary to remove foreign material from the windshield. This operation is intermittently repeated until the supply of cleaning fluid in the reservoir 51 is exhausted. The pressure drop in the reservoir 51 does not follow a straight line ratio as indicated by the line BC in FIG. 9 because the methanol continuously and in response to pressure decreases in the chamber 59 releases gaseous carbon dioxide over a period of time. This additional gaseous carbon dioxide being confined to the reservoir 51 and container 53 increases the gaseous pressure applied to the mixture of methanol and water. As shown in FIG. 9 by the stepped line E, the pressure in the reservoir and container follows an irregular pattern and which pressure builds up during the period that the washer system is not in use to gradually lower values as the volume of cleaning fluid in the reservoir 51 is decreased.

It is apparent that the size of the container, quantity of methanol and carbon dioxide may be selectively varied to produce a desired pressure. For example, the mixture of eleven fluid ounces of methanol with eight grams of dry carbon dioxide in a thirteen fluid ounce container results in a gas pressure in the container of 42 p.s.i. In addition, the quantity of water in the reservoir and size of the reservoir may be changed to vary the limits of the gaseous pressure in the reservoir 51.

Figure 10:
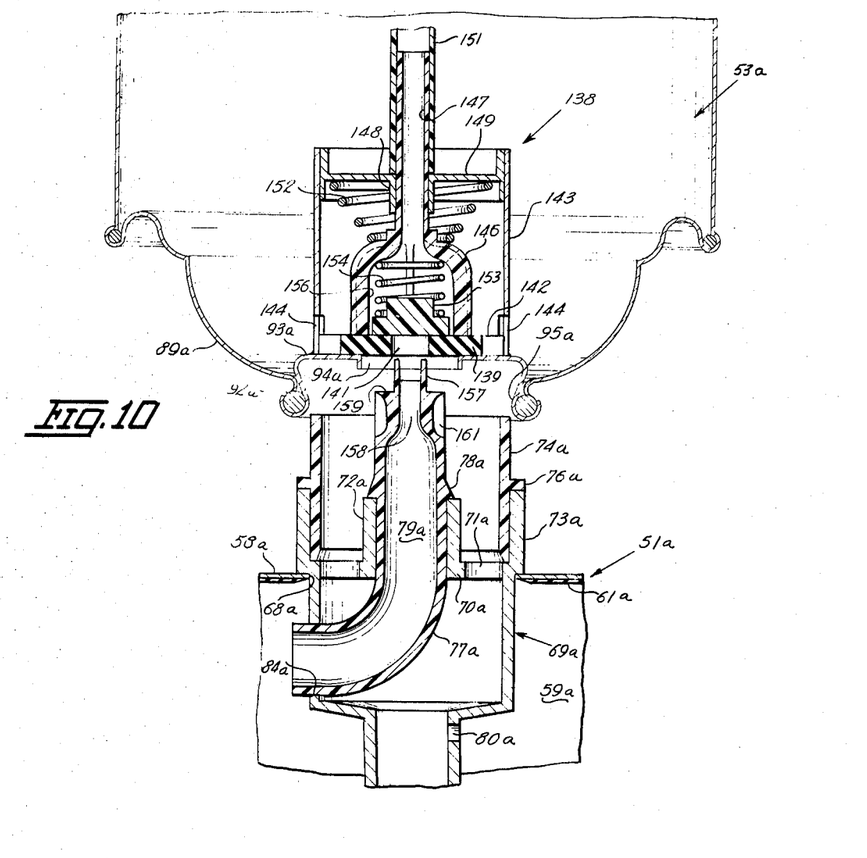
FIG. 10 is a sectional view similar to FIG. 6 of a modified valve assembly shown in the closed position.
Figure 11:
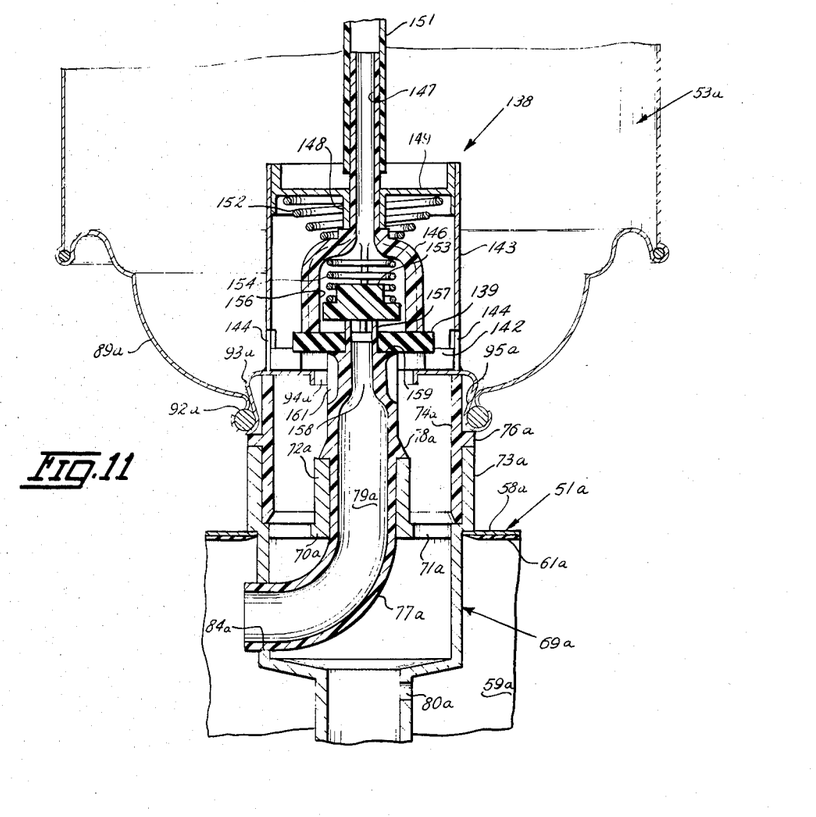
FIG. 11 is a sectional view similar to FIG. 10 showing the valve assembly in the open position.

Referring to FIGS. 10 and 11 there is shown a solvent container having a modified valve assembly indicated generally at 138. The container and reservoir are substantially identical to reservoir 51 shown in FIG. 2 and the container 53 shown in FIG. 3. Identical parts are identified with the same reference number having a suffix a.

The valve assembly 138 is mounted on the inside of the cup-shaped cap 93a over the hole 94a therein. The valve assembly 138 comprises a flat washer 139 formed from deformable material such as rubber. The washer 139 has a central opening 141 in alignment with the passage 79a in the tubular member 77a. The washer 139 is maintained in a concentric relation with the hole 94a by a pair of arcuate guides 142, one of which is shown, which engage the periphery of the washer 139. A sleeve 143 is secured to the guides 142 and the inside of the cap 93a positioning the guides adjacent the inside surface of the cap 93a. The sleeve 143 has openings 144 between the arcuate guides 142 to permit the solvent to freely flow into the sleeve 143.

Positioned on the top side of the washer 139 is an inverted cup-shape member 146 having an upwardly extended tubular section 147. The large end of the cup-shape member 146 engages the flat washer 139 and the tubular section 147 guidably extends through a sleeve 148 carried by a disc 149 secured to the top end of the sleeve 143. A plastic hose 151 is telescoped over the end of the tubular section 147 and terminates adjacent the upper end of the container 53a. The cup-shape member 146 is biased in a downward direction against the washer 139 by a coil spring 152 interposed between the top of the housing 146 and the disc 149.

The center opening 141 and the flat washer 139 is covered by a circular cap 153 positioned within the cup-shaped member 146. A coil spring 154 engages the cap 153 and the top wall of the cup-shaped member 146. The spring 154 biases the cap 153 into engagement with the flat washer 139. The cap 153 is longitudinally guided in the cup-shaped member 143 by a plurality of radial ribs 156 which engage the peripheral surface of the cap 153.

The upper end section of the tubular member 77a coacts with the circular cap 153 and the rubber washer 139 to sequentially move the circular cap 153 to an open position and subsequently move the rubber washer 139 out of sealing engagement with the container cap 93a. The upper section of the tubular member 77a has a pair of upwardly extended lips 157 and a passage 158 opening into the main passage 79a. An annular shoulder 159 is formed on the top of the tubular member 77a below the lips 157. The side wall of the tubular member 77a immediately below the shoulder 159 has a plurality of longitudinal grooves 161 which form channels for the flow of solvent from the container 53a through the cap 93a.

As shown in FIG. 10, the distance from the shoulder 159 to the end of the lips 157 is greater than the thickness of the rubber washer 139. When the container 53a is moved into an assembled relation with the reservoir 51a the lips 157 engage the cap 153 before the shoulder 159 engages the rubber washer 139. The lips 157 function as stops for the cap 153 so that when the container 53a is moved in a downward direction the rubber washer 139 is moved away from the cap 153 and the spring 154 is compressed between the cup-shaped member 146 and the cap 153.

When the cap 153 is in the open position as shown in FIG. 11, the compressed gas in the top of the container 53a flows through the plastic hose 151 into the tubular section 147 and around the cap 153 in the spaces between the ribs 156. The gas moves around the cap 153 into the passages 158 and 79a and is discharged into the chamber 59a of the reservoir 51a.

As shown in FIG. 11, when the container 53a is moved to the locked position the flange 95a of the container cap 93a is in sealing engagement with the outer surface of the plastic sleeve 74a. The lips 157 extend through the opening 141 in the rubber washer 139 and the annular shoulder 159 of the tubular member 77a engages the outside surface of the washer 139. The annular shoulder 159 functions as a stop for the washer 139 with the result that movement of the container 53a to the locked position compresses the spring 152 between the top of the cup-shaped member 146 and the disc 149.

The downward movement of the container 53a moves the cap 93a away from the rubber washer 139 breaking the seal therebetween. The liquid solvent in the container 53a flows through the openings 144 in the sleeve 143, under the rubber washer 139 and through the hole 94a in the cap 93a into the annular chamber surrounding the tubular member 77a. The solvent flows in a downward direction under the influence of gravity and the gas pressure in the container 53a through the tube 69a and discharged in the bottom portion of the reservoir 51a.

All of the solvent in the container 53a will flow continuously into the reservoir 51a. As the liquid solvent flows from the container 53a it is replaced with gas from the reservoir 51a which flows around the open valve member 153 through the plastic hose 151 to the top of the container.

While this invention has been specifically disclosed in connection with the use of methanol and carbon dioxide the invention is not to be so limited. The container 53 may be filled with a liquid capable of absorbing a gas to maintain a relatively uniform pressure. In mixing of the gas absorbing liquid with water or a second liquid, the gas is gradually released over an extended period of time to maintain a selected range of pressures in the reservoir.

In summary, the windshield washer system of this invention has an enclosed reservoir 51 for storing a predetermined amount of cleaning liquid, such as water. The reservoir is connected to nozzle means 47 by suitable fluid conducting hoses and a control valve 37. A disposable container 53 having a predetermined quantity of liquid solvent stored under gaseous pressure is connected to the reservoir. First and second valves on the container operate to selectively release the gaseous pressure in the container into the reservoir and subsequently permit the flow of solvent from the container into the reservoir. When the liquid solvent of the container is mixed with the cleaning liquid in the reservoir the gas absorbed by the solvent is released thereby establishing a gaseous pressure in the reservoir 51.

The actuation of the control valve 37 permits the cleaning fluid in the reservoir 51 to flow through the hoses 38, 43 and 46 to the nozzles 47 which direct cleaning fluid onto the windshield 18. The dispensing of cleaning fluid onto the windshield 18 is continuous as long as the valve 37 is open and the reservoir 51 has a supply of cleaning fluid.

While there have been shown, described, and pointed out the fundamental novel features of the invention, it is to be understood that various omissions, substitutions, changes in form and details of the washer system illustrated may be made by those skilled in the art, without departing from the scope of the invention which is to be limited only as indicated by the scope of the following claims.

We claim:
1. A windshield washer system for a vehicle having a windshield comprising:
 (a) enclosed reservoir means mounted on the vehicle for storing cleaning liquid,
 (b) means including at least one nozzle and a control valve, said means operable on actuation of the control valve to transmit cleaning fluid from the reservoir means to the windshield,
 (c) container means for storing liquid solvent under gaseous pressure,
 (d) a first valve means on said container means for releasing the gaseous pressure,
 (e) second valve means on said container means for controlling the flow of solvent therefrom,
 (f) coacting means on said container means and reservoir means for connecting in a fluid sealed relationship the container means with the reservoir means,
 (g) means on said reservoir means engageable with said first and second valves to sequentially open said valves in response to the connecting of said coacting means to first release the gaseous pressure into the reservoir and subsequently allow the liquid solvent to flow into said reservoir, and

(h) means for holding said container means on the reservoir means.

2. The windshield washer system defined in claim 1 wherein:
(a) said first valve means is positioned in a concentric relation with said second valve means.

3. A windshield washer system for a vehicle having a windshield comprising:
(a) enclosed reservoir means mounted on the vehicle for storing cleaning fluid,
(b) means including at least one nozzle and a control valve, said means operable on actuation of the control valve to transmit cleaning fluid from the reservoir means to the windshield,
(c) container means for storing liquid solvent under gaseous pressure,
(d) valve means on said container means for controlling the flow of solvent therefrom,
(e) coacting means on said container means and reservoir for connecting the container means and reservoir in a fluid sealed assembly relation,
(f) means on said reservoir engageable with said valve means in response to the connecting of said coacting means to open said valve means, whereby to fluid connect the container means and reservoir, and
(g) means for holding said container means on the reservoir means.

4. A windshield washer system for a vehicle having a windshield comprising:
(a) reservoir means mounted on the vehicle for storing cleaning fluid,
(b) means including at least one nozzle and a control valve, said means operable on actuation of the control valve to transmit cleaning fluid from the reservoir means to the windshield,
(c) container means for storing liquid solvent,
(d) valve means on said container means for controlling the flow of solvent therefrom,
(e) coacting means on said container means and reservoir for connecting the container means and reservoir influid sealed assembly relation, and
(f) means on said reservoir engageable with said valve means in response to the connecting of said coacting means to open said valve means, whereby to fluid connect the container means and reservoir.

5. In a windshield washer system having a water reservoir, fluid dispensing nozzles, hose means connecting the reservoir and the nozzles, and valve means in said hose means operable to control the flow of fluid from the reservoir to the nozzles:
(a) container means for storing liquid solvent under pressure,
(b) valve means on said container means for controlling the flow of solvent therefrom,
(c) coacting means on said container means and reservoir for connecting the container means and reservoir in a fluid sealed assembly relation, and
(d) means on said reservoir engageable with said valve means in response to the connecting of said coacting means to open said valve means, whereby to fluid connect the container means and reservoir.

6. In a windshield washer system having a reservoir for storing a cleaning liquid and means for dispensing the cleaning liquid onto the windshield of a vehicle:
(a) container means for storing liquid solvent under pressure,
(b) first valve means on said container means for releasing the gaseous pressure into the reservoir,
(c) second value means on said container means for controlling the flow of liquid solvent therefrom,
(d) coacting means on said container means and reservoir for connecting the container means and reservoir in a fluid sealed assembly relation, and
(e) means on said reservoir means engageable with said first and second valve means to sequentially open said valves in response to the connecting of said coacting means to first release the gaseous pressure into the reservoir and subsequently allow the liquid solvent to flow into said reservoir.

7. In a windshield washer system as defined in claim 6 wherein:
(a) said first valve means is positioned on said container means in a concentric relation with said second valve means.

8. In a windshield washer system:
(a) enclosed reservoir means for storing cleaning fluid,
(b) container means for storing liquid solvent under gaseous pressure,
(c) first valve means on said container means for releasing the gaseous pressure,
(d) second valve means on said container means for controlling the flow of solvent therefrom,
(e) coacting means on said container means and reservoir means for connecting the container means and reservoir means in a fluid sealed assembly relation,
(f) first tubular means on said reservoir means engageable with said first valve means in response to the connection of said coacting means to open said first means to release gaseous pressure into the top area of the reservoir, and engageable with the second valve means to open said second valve means, and valve means, and
(g) second tubular means secured to said reservoir means and extended into the reservoir means terminating adjacent the bottom thereof, said second tubular means directing the liquid solvent into the bottom area of the reservoir means.

9. The windshield washer system defined in claim 8 including:
(a) bleed means in the portion of the second tubular means adjacent the second valve means for allowing excessive gas pressure in the second tubular means to escape into the top of the reservoir means, and
(b) check valve means operatively associated with said second tubular means for preventing the flow of cleaning fluid from the reservoir means into the second tubular means.

10. In a windshield washer system:
(a) enclosed reservoir means for storing cleaning fluid,
(b) container means for storing liquid solvent under gaseous pressure,
(c) valve means on said container means for controlling the flow of solvent therefrom,
(d) coacting means on said container means and reservoir means for connecting the container means and reservoir means in a fluid sealed assembly relation,
(e) first tubular means on said reservoir means engageable with said valve means in response to the connecting of said coacting means to open said valve means to release gaseous pressure into the top area of the reservoir,
(f) second tubular means secured to said reservoir means adjacent the first tubular means and extended into the reservoir means terminating adjacent the bottom thereof, said second tubular means directing the liquid solvent from the open valve means to the bottom area of the reservoir means, and
(g) bleed means in the portion of the second tubular means adjacent the valve means for allowing excessive gas pressure in the second tubular means to escape into the top of the reservoir means.

11. The windshield washer system defined in claim 10 including:
(a) check valve means operatively associated with said second tubular means for preventing the flow of cleaning fluid from the reservoir means into the second tubular means.

12. In a windshield washer system:
(a) enclosed reservoir means for storing cleaning fluid,
(b) container means for storing liquid solvent under gaseous pressure, (c) valve means on said container means for controlling the flow of solvent therefrom,
(d) coacting means on said container means and reservoir means for connecting the container means and reservoir means in a fluid sealed assembly relation,
(e) first tubular means on said reservoir means engageable with said valve means in response to the connecting of said coacting means to open said valve means to release gaseous pressure into the top area of the reservoir,
(f) second tubular means secured to said reservoir means adjacent the first tubular means and extended into the reservoir means, said second tubular means directing the liquid solvent from the open valve means into the reservoir means, and
(g) bleed means in the portion of the second tubular means for allowing excessive gas pressure in the second tubular means to escape into the reservoir means.

13. In a windshield washer system having an enclosed reservoir for storing a cleaning liquid and means for dispensing the cleaning liquid onto the windshield of a vehicle:
(a) container means for storing liquid solvent under pressure,
(b) first valve means on said container means for releasing the gaseous pressure into the reservoir,
(c) second valve means on said container means for controlling the flow of liquid solvent therefrom,
(d) coacting means on said container means and reservoir for connecting the container means and reservoir in a fluid sealed assembly relation, and
(e) means on said reservoir means engageable with said first and second valve means to sequentially open said valves in response to the connecting of said coacting means to first release the gaseous pressure into the top of the reservoir and subsequently allow the liquid solvent to flow into the bottom of the reservoir.

14. A disposable container having liquid solvent under gaseous pressure therein for a windshield washer system including a water reservoir, fluid dispensing nozzles, hose means connecting the reservoir and the nozzles, and valve means in said hose means operable to control the flow of fluid from the reservoir to the nozzles comprising:
(a) container means for storing liquid solvent under gaseous pressure,
(b) first valve means on said container means for releasing the gaseous pressure,
(c) second valve means on said container means for controlling the flow of liquid solvent therefrom, and
(d) cap means on said container means supporting the first valve means and second valve means within said container means, said cap means having a section engageable with a portion of said reservoir for connecting the container means with the reservoir in a fluid sealed relationship.

15. The disposable container defined in claim 14 wherein:
(a) said first valve means is positioned in a concentric relation with said second valve means.

16. In a windshield washer system including a water reservoir for storing a cleaning liquid and means for dispensing the cleaning liquid into the windshield of a vehicle;
(a) container means for storing liquid solvent under pressure,
(b) first valve means on said container means for releasing the gaseous pressure.
(c) second valve means on said container means for controlling the flow of liquid solvent therefrom, and
(d) means on said container means engageable with a portion of said reservoir for connecting the container means with the reservoir in a fluid sealed relationship.

17. A method of establishing gaseous pressure in a reservoir having a stored quantity of water comprising the steps of:
(a) absorbing a quantity of carbon dioxide in methanol in a closed container to establish a preselected superatmospheric gaseous pressure in the container,
(b) coupling the container in a fluid sealed relationship with the reservoir,
(c) releasing the gaseous pressure into the reservoir to equalize the pressure in the container and reservoir, and
(d) discharging the methanol and absorbed carbon dioxide in the container into the reservoir, said methanol and absorbed carbon dioxide mixing with the water in the reservoir and releasing gaseous carbon dioxide from the methanol thereby raising the gaseous pressure in the reservoir and container.

18. A method of establishing a gaseous pressure in a reservoir having a stored quantity of water comprising the steps of:
(a) absorbing a quantity of carbon dioxide in methanol in a closed container to establish a preselected superatmospheric gaseous pressure in the container,
(b) coupling the container in a fluid sealed relationship with the reservoir, and
(c) discharging the methanol and absorbed carbon dioxide in the container into the reservoir, said methanol and absorbed carbon dioxide mixing with the water in the container and releasing gaseous carbon dioxide from the methanol thereby raising the gaseous pressure in the reservoir and container.

19. A method of establishing a gaseous pressure in a reservoir having a stored quantity of a first liquid comprising the steps of:
(a) mixing in a closed container a quantity of a gas with a second liquid capable of absorbing a part of said gas to establish a preselected superatmospheric gaseous pressure in the container.
(b) coupling the container in a fluid sealed relationship with the reservoir,
(c) releasing the gaseous pressure into the reservoir to equalize the pressure in the container and reservoir, and
(d) discharging the second liquid in the container into the reservoir to mix the second liquid with the first liquid in the container thereby releasing the gas absorbed by the second liquid and raising the gaseous pressure in the reservoir.

20. A method of establishing a gaseous pressure in a reservoir having a stored quantity of a first liquid comprising the steps of:
(a) mixing a quantity of a gas with a second liquid in a closed container to establish a preselected superatmospheric gaseous pressure in the container,
(b) coupling the container in a fluid sealed relationship with the reservoir,
(c) releasing the gaseous pressure into the reservoir to equalize the pressure in the container and reservoir, and
(d) discharging the second liquid in the container into the reservoir to mix the second liquid with the first liquid in the container and raising the gaseous pressure in the reservoir.

21. A method of establishing a gaseous pressure in a reservoir having a stored quantity of a first liquid comprising the steps of:
(a) mixing in a closed container a quantity of a gas with a second liquid capable of absorbing a part of said gas to establish a preselected superatmospheric gaseous pressure in the container,
(b) coupling the container in a fluid sealed relationship with the reservoir,
(c) releasing the gaseous pressure into the top area of the resrvoir to equalize the pressure in the container and reservoir, and (d) discharging the second liquid in the container into the bottom area of the reservoir to mix the second liquid with the first liquid in the reservoir thereby releasing the gas absorbed by the second liquid and raising the gaseous pressure in the reservoir.

22. A method of transferring liquid under gaseous pressure from a container to an enclosed reservoir comprising the steps of:

(a) coupling the container in a fluid sealed relationship with the reservoir, (b) holding the container in a coupled relationship with the reservoir, (c) releasing the gaseous pressure in the container into the reservoir to equalize the gas pressure in the container and reservoir, and (d) discharging the liquid from the container into the reservoir.

23. The method defined in claim 22 including the step of:

(a) maintaining a substantially equal gas pressure in the container and reservoir during the discharge of the liquid from the container into the reservoir.

24. A method of transferring liquid under gaseous pressure from a container to an enclosed reservoir comprising the steps of:

(a) coupling the container in a fluid sealed relationship with the reservoir, (b) releasing the gaseous pressure in the container into the reservoir to equalize the gas pressure in the container and reservoir, and (c) discharging the liquid from the container into the reservoir.

25. The method defined in claim 24 including the step of:

(a) maintaining a substantially equal gas pressure in the container and reservoir during the discharge of the liquid from the container into the reservoir.

References Cited by the Examiner

UNITED STATES PATENTS

| 2,671,590 | 3/1954 | McBean | 141—3 |
| 2,757,843 | 8/1956 | Smith | 141—5 |
| 2,780,491 | 2/1957 | Gauthier | 239—284 |
| 3,021,870 | 2/1962 | Allen | 222—4 X |
| 3,028,052 | 4/1962 | Archer | 222—136 |
| 3,087,681 | 4/1963 | Riester | 239—284 |
| 3,115,277 | 12/1963 | Montague | 222—52 |
| 3,122,180 | 2/1964 | Abplanalp | 141—3 |
| 3,144,966 | 8/1964 | Cook | 222—136 |
| 3,181,737 | 5/1965 | Chaucer | 222—399 X |

ROBERT B. REEVES, *Primary Examiner.*

EVERETT W. KIRBY, LOUIS J. DEMBO, *Examiners.*

D. L. MOSELEY, F. R. HANDREN, H. S. LANE,
*Assistant Examiners.*